Jan. 16, 1923.
P. DuFORD.
SHOCK ABSORBER.
ORIGINAL FILED APR. 16, 1921.
1,442,713
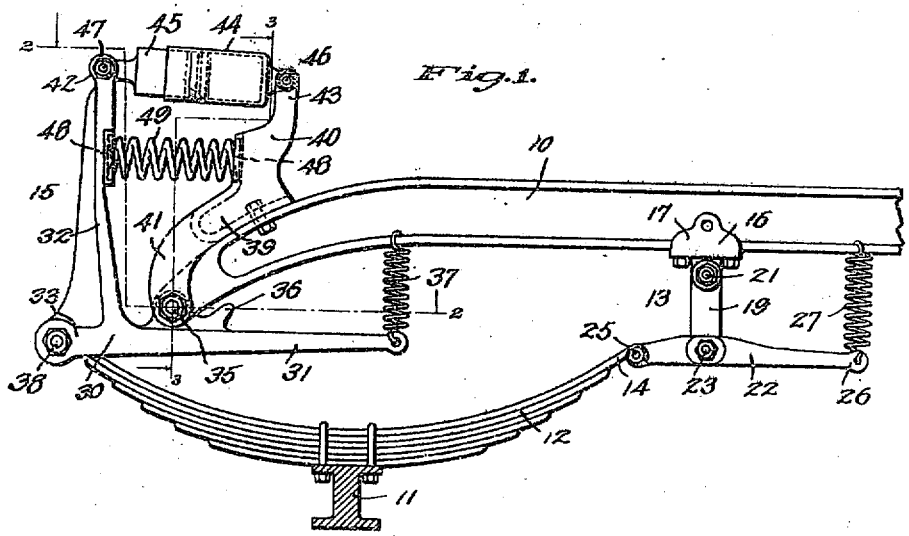
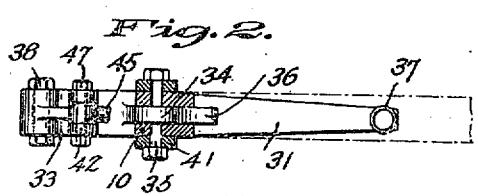
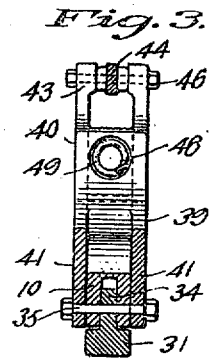
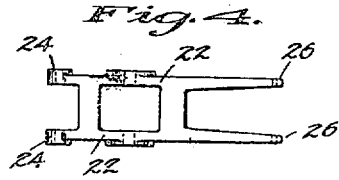
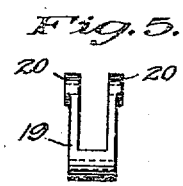
WITNESSES
INVENTOR
PETER DuFORD
BY
ATTORNEYS Patented Jan. 16, 1923.

1,442,713

UNITED STATES PATENT OFFICE.

PETER DU FORD, OF ONTARIO, OREGON.

SHOCK ABSORBER.

Application filed April 16, 1921, Serial No. 461,992. Renewed June 22, 1922. Serial No. 570,183.

*To all whom it may concern:*

Be it known that I, PETER DU FORD, a citizen of the United States, and a resident of Ontario, in the county of Malheur and State of Oregon, have invented a new and Improved Shock Absorber, of which the following is a full, clear, and exact description.

This invention relates to shock absorbing devices and is particularly designed and intended for use in connection with the front or rear springs of a motor vehicle, the same being in the nature of an improvement over my co-pending applications respectively filed May 20th, 1919, Serial No. 298,339, February 4th, 1920, Serial No. 356,117, and September 14th, 1920, Serial No. 410,161.

The invention contemplates and has for one of its principal objects the provision of a simple, inexpensive and highly efficient shock absorbing device which may be readily associated with any standard vehicle, without the necessity of materially altering the same.

The invention further contemplates the provision of a shock absorbing device which operates to effectively reduce to a minimum the shocks and jars due to inequalities in the road which are ordinarily imparted to the vehicle.

Another object of the invention resides in the provision of means for retarding rebound action of the shock absorbing elements whereby the deflection and return of parts to their normal position is gradually accomplished.

A further object of the invention resides in the provision of a shock absorbing device which includes means operable to carry ordinary stress, and means for limiting the operation of said means whereby the heavier shocks and jars are carried by the usual elliptical vehicle spring.

With these and other objects in view, the invention resides in the novel construction, combination and arrangement of parts set forth in the following specification, pointed out in the appended claims and illustrated in the accompanying drawings in which:

Figure 1 is a side elevation of the shock absorbing device illustrating its association with the chassis and vehicle spring.

Figure 2 is a horizontal sectional view taken approximately on the line 2—2 of Fig. 1.

Figure 3 is a transverse sectional view taken approximately on the line 3—3 of Figure 1.

Figure 4 is a detail plan view of the supporting lever in the rear end of the vehicle spring.

Figure 5 is a detail view of the supporting and connecting link therefor.

Figure 6 is a detail view of the chassis bracket from which the supporting link is suspended.

Referring to the drawings by characters of reference, 10 designates the front end of the chassis of the vehicle, 11 the front axle and 12 the usual elliptical spring which is secured medially to said axle.

The shock absorbing device comprises the means 13 for associating the rear end 14 of the spring 12 with the chassis and the means 15 for associating the front end of said spring therewith. The means 13 includes the chassis bracket 16 having upstanding side flanges 17 and a depending aperture knuckle 18. The bracket is secured to the underside of the chassis with the side flanges disposed at opposite sides thereof to embrace the same. A U-shaped connecting and supporting link 19 having spaced apertured upper extremities 20 disposed at opposite sides of the knuckle 18 is provided a pin or bolt 21 passing through the aligned apertures in the knuckle and extremities for pivotally associating said link with the chassis bracket. The lower end of the link is transversely apertured and is received between the spaced side arms of the supporting lever 22, a pivot pin or bolt 23 being adapted to be passed through said side arms and the apertured extremity of the link for pivotally connecting the lever thereto. The outer spaced extremities 24 are apertured to align with the eye formed at the inner extremity 14 of the vehicle spring to receive the transverse connecting bolt 25. The inner extremities 26 of the side arms of the supporting lever are apertured to receive the lower extremity of a coiled expansion spring 27, the upper extremity of which is secured to the chassis. By this arrangement the inner extremity or end of the vehicle spring 12 is yieldably supported from the chassis for limited movements in any direction in a vertical plane, the spring 27 serving to absorb and carry the lighter shocks and jars imparted to the spring 12.

The means 15 includes a bell crank lever 30 having horizontal and vertical arms 31 and 32 disposed substantially at a right angle to each other and provided with a horizontal forwardly projecting extension 33. The arm 31 is provided with a vertical ear 34 having a transverse aperture therein, said ear being designed to be received between the forward bifurcated extremity of the chassis. A transverse pivot bolt 35 is passed through the bifurcated extremity of the chassis and the apertured ear 34 to fulcrum the bell crank lever to the chassis. The ear is provided with an integral lug 36 which is designed to co-act with the underside of the chassis for limiting the upward swinging movement of the arm 31. A coiled expansion spring 37 is connected at its opposite ends to the chassis and the inner free extremity of the arm 31 to normally exert a tension for lifting and yieldably supporting the inner extremity of said arm. The forward end of the vehicle spring 12 is pivoted to the extension 33 by the bolt 38 which is passed through the usual eye formed on the same. A bearing member 39 having an upstanding bearing arm 40 is bifurcated at its lower extremity 41 to straddle the forward extremity of the chassis, the bolt 35 passing through apertures therein to constitute a common securing means therefor in addition to functioning as a pivot or fulcrum for the bell crank lever 30. The upper free end of the arm 32 is bifurcated and the upper extremity 43 of the bearing arm is also bifurcated. A dash pot including a cylinder 44 and a plunger 45 are respectively connected to the bearing arm extremity 43 and the lever arm extremity 32 as at 46 and 47. The bearing arm 40 and the lever arm 32 are respectively provided with circular depressions or recesses 48 in which the opposite end convolutions of a coiled compression spring 49 are received. By this arrangement it will be noted that the upward movement of the forward end of the vehicle spring 12 will tend to swing the vertical arm 32 of the bell crank lever rearwardly and the horizontal arm 31 thereof downwardly thus expanding the spring 37 and compressing the spring 49. At the same time the plunger 45 will be thrust into the cylinder 44 against the compression of the fluid (air or liquid) contained therein to retard the movement of the lever and absorb a portion of the shock. The return movement of the parts to normal will likewise be retarded by the dash pot. When the compression of the spring 49, the expansion of the spring 37 and the retarding action of the dash pot 45 reach a combined resistance in excess of the vehicle spring resistance, the latter will be brought into play and the remaining load will be carried by the springs 37, 49, the dash pot and the vehicle spring.

It will thus be seen that a highly efficient and comparatively simple shock absorbing device is provided which includes ample means for carrying the various loads to which it will probably be subjected. It should be further noted that the shock absorbing device affords means for associating the vehicle spring with the chassis which permits of limited relative movements between the vehicle spring and chassis in any direction in a vertical plane, the device serving to effect the return of said parts to normal relative position.

While there has been illustrated and described a single and preferred embodiment of the invention, no limitation is necessarily made to the precise structural details herein exhibited, as it is to be understood that variations and modifications which properly fall within the scope of the appended claims may be resorted to when found expedient.

I claim:

1. The combination with a vehicle spring and chassis, of a shock absorbing device adapted to operatively associate the same, comprising means for yieldingly supporting the inner end of the vehicle spring from the chassis for limited movements in any direction in a vertical plane, a bell crank lever fulcrumed to the chassis, a coiled expansion spring connecting the free end of the vertical arm of said lever with the chassis, a coiled compression spring interposed between the free end of the vertical arm and the chassis, means for retarding the movement of said lever in either direction, and an extension from the lever at the juncture of the arms to which the forward end of said vehicle spring is pivotally connected.

2. The combination with a vehicle chassis and spring, of a shock absorbing device adapted to associate the spring with said chassis, comprising a lever pivoted between its ends to the chassis, means connected respectively to the rear end of the lever and the chassis for exerting a lift on said end, the opposite end of said lever having connection with the forward end of the vehicle spring, an arm extending vertically from the lever between the forward end and its pivot, means interposed between said arm and the chassis for effecting relative separation therebetween, means between the free end of said arm and the chassis for retarding movement of the lever in either direction and means for yieldingly supporting the opposite end of the vehicle spring from the chassis for movement in any direction in a vertical plane.

PETER DU FORD.